(12) United States Patent
Umeda

(10) Patent No.: US 7,681,706 B2
(45) Date of Patent: Mar. 23, 2010

(54) LOCKING DEVICE

(75) Inventor: Kouji Umeda, Osaka (JP)

(73) Assignee: Hosiden Corporation, Yao-shi, Osaka (JP)

( * ) Notice: Subject to any disclaimer, the term of this patent is extended or adjusted under 35 U.S.C. 154(b) by 580 days.

(21) Appl. No.: 11/455,843

(22) Filed: Jun. 20, 2006

(65) Prior Publication Data
US 2007/0000294 A1    Jan. 4, 2007

(30) Foreign Application Priority Data
Jun. 29, 2005    (JP)    ............................. 2005-189249

(51) Int. Cl.
*B60W 10/10*    (2006.01)
*B60W 10/18*    (2006.01)
(52) U.S. Cl. .................. 192/220.4; 74/473.26
(58) Field of Classification Search ............. 192/220.3, 192/220.4, 220.7; 74/473.24, 473.25, 473.26; 477/96
See application file for complete search history.

(56) References Cited

U.S. PATENT DOCUMENTS 3,795,153 A * 3/1974 Seilly ......................... 74/335
5,025,901 A * 6/1991 Kito et al. ................. 192/220.7
5,671,638 A * 9/1997 Hattori et al. ............. 74/483 R
5,685,405 A * 11/1997 Morikawa et al. ........ 192/220.2
5,799,517 A * 9/1998 Hattori et al. ................. 70/247

FOREIGN PATENT DOCUMENTS

JP    2005-47406    2/2005

* cited by examiner

*Primary Examiner*—Rodney H Bonck
(74) *Attorney, Agent, or Firm*—Bacon & Thomas, PLLC

(57) ABSTRACT

The present invention relates to a locking device which has an electromagnet solenoid, and more particularly to a locking device which has an electromagnet solenoid, and which is suitably used in a shift lever lock in a vehicle automatic transmission apparatus. In the present invention the attraction type solenoid is used for controlling the operations of the movable members of the locking device. A locking device is provided in which the movable members of the locking device can be smoothly operated without hindrance, locking and unlocking operations of the locking device are highly reliable, and a harsh operation noise can be prevented by a shock-absorbing member from being produced, and which is simple and compact in configuration, and economical.

12 Claims, 5 Drawing Sheets

US 7,681,706 B2

LOCKING DEVICE

BACKGROUND OF THE INVENTION

1. Field of the Invention

The present invention relates to a locking device which has an electromagnet solenoid, and more particularly to a locking device which has an electromagnet solenoid, and which is suitably used in a shift lever lock in a vehicle automatic transmission apparatus.

2. Description of the Prior Art

In order that a vehicle (AT vehicle) on which an automatic transmission apparatus is mounted is prevented from being suddenly started as a result of an erroneous operation in which a shift lever is accidentally shifted from a parking range position to another range position, conventionally, a locking device with an electromagnet solenoid has been proposed (for example, Japanese Patent Application Laying-Open No. 2005-47406). The locking device is used in a shift lever lock for a vehicle automatic transmission apparatus in which, when the shift lever is located at the parking range position, the shift lever is locked so that a shift operation to another range position is restricted, and, in accordance with a depressing operation on a foot brake, the shift lever lock is cancelled and a shift operation to another range position is allowed.

SUMMARY OF THE INVENTION

In the conventional locking device, since a suction type solenoid is used, an urging member which laterally compresses a locking member disposed integrally with a movable core cannot be placed in a middle portion of the locking member (the urging member is placed above or under the solenoid). When the movable core is sucked to or separated from a stationary core, therefore, a rotary moment acts on the movable core and the locking member. Consequently, the movable core and the locking member are tilted, and a prying phenomenon may occur, thereby causing a problem in that such a locking device has low operation reliability. Furthermore, the suction type solenoid has a problem in that the surface state (the inclination of a suction face, adhesion of a foreign matter, rust, and the like) of the movable core largely affects the suction force, and this causes a serious effect on the reliability of the locking device. The suction type solenoid has a further problem in that a harsh operation noise (a sound of a collision between metals) is produced at the instant when the movable core is sucked to the stationary core.

In order to solve the problems of the conventional art, the invention provides a locking device wherein the locking device comprises: a first movable member which is reciprocable between an engaging position with respect to an external mechanism and a disengaging position; a first urging member which always urges the first movable member toward the engaging position; a second movable member which is reciprocable in a direction perpendicular to the first movable member between a locking position where one end portion overlaps with an operation region end portion in a disengaging direction of the first movable member, and a unlocking position where the one end portion deviates from the operation region end portion; a second urging member which always urges the second movable member toward the locking position; and a solenoid in which a stationary core in a coil is magnetized by energization of the coil to attract a movable plate swingably attached to a frame by an attraction force acting between the stationary core and the movable plate, from a separating position which is separated from the stationary core by a constant distance, toward the stationary core, a tip end portion of the movable plate of the solenoid is engaged with the second movable member, and, in a nonenergization period of the coil of the solenoid, by an urging force of the second urging member, the second movable member is held to the locking position and the movable plate of the solenoid is held to the separating position, the second movable member at the locking position restricts an operation of the first movable member from the engaging position to the disengaging position, and, in an energization period of the coil of the solenoid, by the attraction force acting between the stationary core and the movable plate, the movable plate of the solenoid is attracted against the urging force of the second urging member from the separating position toward the stationary core and the second movable member is operated from the locking position toward the unlocking position, thereby allowing the first movable member to be operated from the engaging position to the disengaging position.

In the invention, a solenoid of the attraction type (also called the fulcrum type, the flapper type, or the magnet type) is used, and hence an operation of the second movable member is conducted not by a suction force of the movable plate, but by the attraction force. Therefore, the operation of the second movable member is not affected by the surface state of the movable plate, with the result that the operation of the second movable member in the locking device is stabilized and the reliability is improved.

Since the attraction type solenoid is used and the tip end portion of the movable plate is engaged with the second movable member which is separated and independent from the movable plate, the second urging member can be placed in a middle portion of the second movable member. In locking and unlocking, therefore, the prying phenomenon is not caused in the operation of the second movable member, and the operation is stabilized. Consequently, the reliability of the locking device is enhanced.

Since the attraction type solenoid is used, a shock-absorbing member can be disposed on the surface of the stationary core to which the movable plate is to be attracted, so that a harsh operation noise is not produced.

In the invention, preferably, a tapered face is disposed in an end portion of the first movable member which is to be engaged with the external mechanism, the tapered face being slidingly contacted with the external mechanism in one direction to cause the first movable member to operate against the urging force of the first urging member from the engaging position toward the disengaging position, the locking device further comprises: a third movable member which is engaged with the first movable member, and which is operable independent from the first movable member; and a third urging member which always urges the third movable member in a same direction as the first movable member, a tapered face is disposed in an end portion of the third movable member which is located on a side of the end portion of the first movable member which is to be engaged with the external mechanism, the tapered face being slidingly contacted with the external mechanism in advance of the tapered face of the first movable member, to cause the third movable member to independently operate against an urging force of the third urging member in advance of the first movable member, a movable-plate pressing portion is disposed in another end portion of the third movable member, and the independent operation of the third movable member causes the movable plate of the solenoid to be pressed against the urging force of the second urging member from the separating position toward the stationary core, and the second movable member to be operated from the locking position toward the unlocking position, thereby allowing the first movable member to be operated from the engaging position to the disengaging position. When this configuration is employed, an unlocking operation in one direction can be conducted mechanically without using an electric power source.

In the invention, in the case where the external mechanism is a shift lever mechanism for a vehicle automatic transmission apparatus, preferably, energization of the coil of the solenoid is conducted in accordance with a depressing operation on a foot brake, and, in a nonenergization period of the coil of the solenoid when the foot brake is not depressed, the first movable member in which an operation from the engaging position to the disengaging position is restricted restricts a shift operation of the shift lever from a predetermined range position to another range position, and, in an energization period of the coil of the solenoid in accordance with a depressing operation on the foot brake, an operation of the first movable member from the engaging position to the disengaging position is allowed, and a shift operation of the shift lever from the predetermined range position to another range position is allowed. When this configuration is employed, the locking device can be suitably used as a shift lever locking device for a vehicle automatic transmission apparatus. In this case, it is preferable to configure the locking device so that, in accordance with a shift operation of the shift lever from another range position to the predetermined range position, the third movable member is independently operated, thereby allowing an operation of the first movable member from the engaging position to the disengaging position. When this configuration is employed, in accordance with a shift operation of the shift lever from another range position to the predetermined range position, an unlocking operation can be conducted mechanically without using an electric power source.

EFFECTS OF THE INVENTION

According to the invention, since an attraction type solenoid is used, it is possible to provide a locking device in which movable members of the locking device can be smoothly operated without hindrance, locking and unlocking operations of the locking device are highly reliable, and a harsh operation noise can be prevented by a shock-absorbing member from being produced, and which is simple and compact in configuration, and economical.

Figure 1:
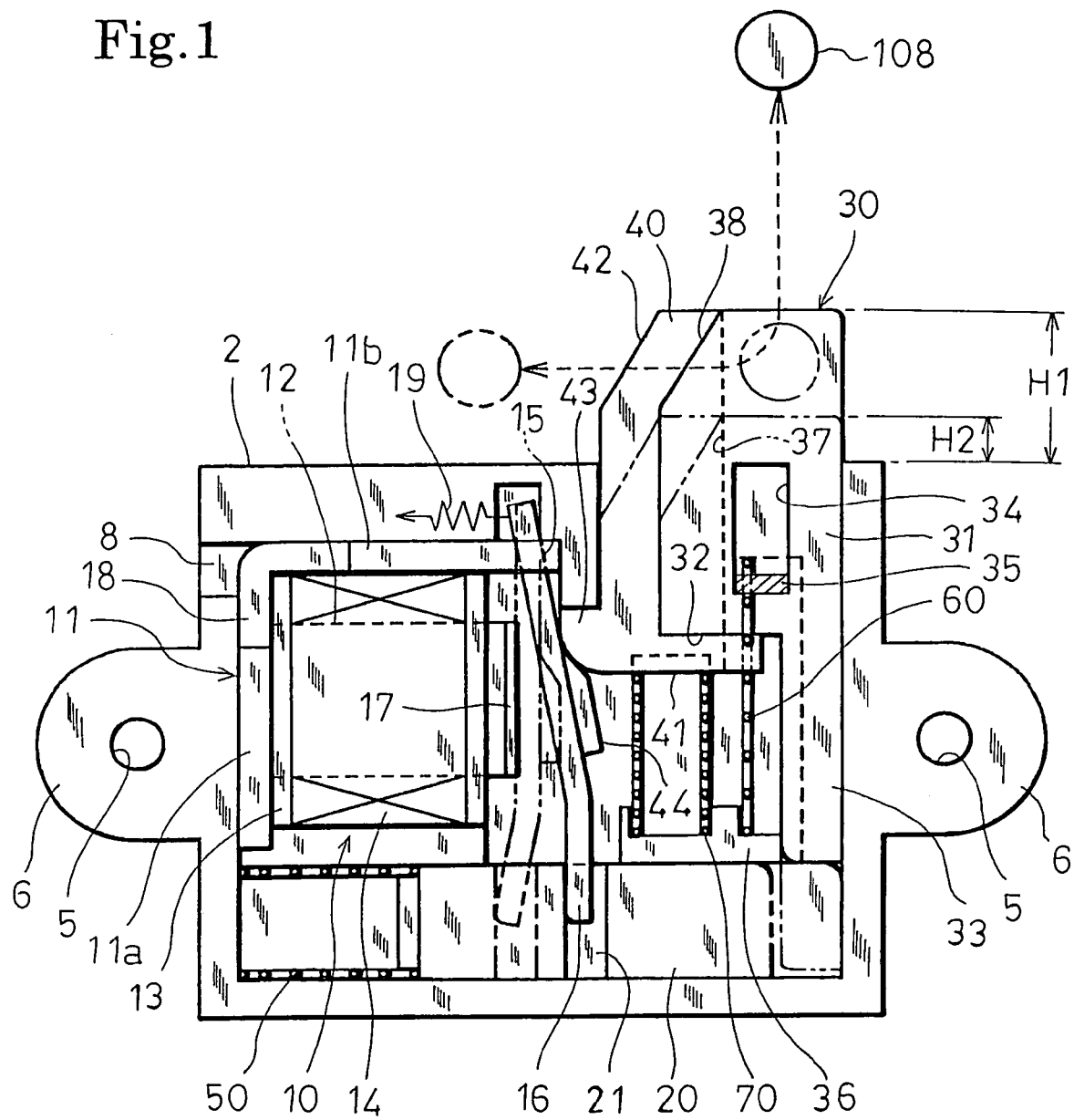
FIG. 1 is a diagram showing the internal structure of a shift lever locking device for a vehicle automatic transmission apparatus according to an embodiment of the invention.

1 case
10 attraction type solenoid
11 frame (yoke)
12 stationary core
14 coil
15 fulcrum
16 movable plate
17 shock-absorbing member
20 stopper (second movable member)
30 main lever (first movable member)
38 tapered face
40 sublever (third movable member)
42 tapered face
43 movable-plate pressing portion
50 second return spring (second urging member)
60 first return spring (first urging member)
70 third return spring (third urging member)
100 shift lever mechanism (external mechanism)
103 shift lever

DETAILED DESCRIPTION OF THE PREFERRED EMBODIMENT

Figure 2:
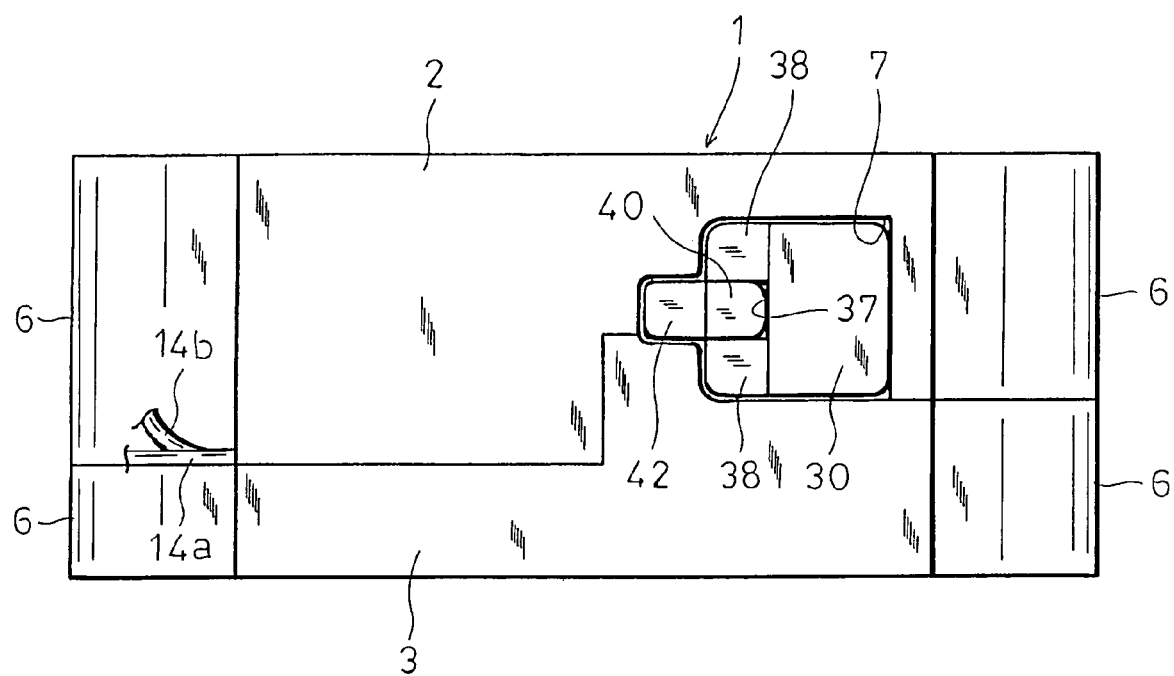
FIG. 2 is a plan view of the locking device.

Hereinafter, an embodiment of the invention will be described with reference to the accompanying drawings. FIG. 1 is a diagram showing the internal structure of a shift lever locking device for a vehicle automatic transmission apparatus according to the embodiment of the invention, FIG. 2 is a plan view of the locking device, FIG. 3 is an operation diagram of the locking device, and FIG. 4 is a diagram schematically illustrating a shift lever mechanism of the vehicle automatic transmission apparatus which is an external mechanism of the locking device.

First, the shift lever mechanism of the vehicle automatic transmission apparatus which is the external mechanism of the locking device will be described with reference to FIG. 4. In FIG. 4, 100 denotes the straight type shift lever mechanism (shift operation unit) which is placed in the vicinity of the driver's seat, for example, between the driver's seat and the front passenger seat, and which is configured by attaching various components to a frame body 101 made of a resin. The reference numeral 102 denotes a lever guide plate which is attached to an upper portion of the frame body 101, and the surface of which is exposed to the interior of the cabin, and 103 denotes a shift lever in which a lower end portion is swingably attached to the frame body 101 via a fulcrum shaft 104, and an upper portion is elongated into the cabin via a straight type lever guide groove 105 disposed in the lever guide plate 102. By pressing or pulling an upper handle 106, the shift lever 103 is shift-operated to one of range positions including a parking range position (P-range) which is set in one end portion of the lever guide groove 105, and other range positions which are sequentially set subsequent to the parking range position, such as a reverse range position (R-range), a neutral range position (N-range), a drive range position (D-range), and a low range position (L-range). In the shift lever 103, a select button 107 is disposed on the upper handle 106, and a shift lock pin 108 is disposed so as to be movable in a predetermined range along the lever axis. The shift lock pin 108 is always urged by a spring force toward the upper end of the shift lever 103. When the select button 107 is operated, the shift lever 103 can be compulsively pressed down toward the lower end of the shift lever 103 against the spring force. The reference numeral 109 denotes a shift lock groove which is opened in the frame body 101 along the lever axis of the shift lever 103 that is positioned in the P-range. The shift lock pin 108 is fitted into the shift lock groove 109. One end of an arcuate guide groove 110 which is opened in the frame body 101 in the shift operation range of the shift lever 103 and on the circumference centered at the fulcrum shaft 104 is connected substantially perpendicularly and communicatingly to a lower end portion of the shift lock groove 109.

In the above configuration, when the shift lever 103 is positioned at the P-range, the select button 107 is operated so as to compulsively press down the shift lock pin 108 to a lower end portion of the shift lock groove 109 against the spring force, and then move the pin to a beginning portion of the guide groove 110, whereby a shift operation from the P-range position to another range position is enabled.

The locking device is placed in the shift lever mechanism 100 in a state where a case (housing) 1 formed in a rectangular parallelepiped shape is attached by two screws 4, 4 to the lower side of the guide groove 110 in the frame body 101, and tip end portions (upper end portions) of a main lever 30 serving as the first movable member, and a sublever 40 serving as the third movable member which is upward projected from a right side portion of an upper side wall of the case 1 to the outside of the case 1 is raised from the lower side at a right lateral position of a lower end portion of the shift lock groove 109.

In the above configuration, when the shift lever 103 is positioned at the P-range and the select button 107 is operated, the shift lock pin 108 butts from the upper side against the tip end face of the main lever 30 of the locking device in front of the lower end portion of the shift lock groove 109. By contrast, when the shift lever 103 is shift-operated from a range position other than the P-range to the P-range position, the shift lock pin 108 butts from a lateral side against side faces of the sublever 40 and the main lever 30 of the locking device in the beginning portion of the guide groove 110.

Next, the locking device will be described with reference to FIGS. 1 and 2. The locking device comprises the case 1 formed in a rectangular parallelepiped shape. The case 1 is configured by a first case 2 which is made of a resin material, and which is deep, and a second case 3 which is joined to the first case 2, and which is shallow. Flanges 6 having screw holes 5 through which the screws 4 are passed in the joining direction are disposed integrally with outer faces of right and left side walls of the first and second cases 2, 3. In an end face of the first case 2 which is joined to the second case 3, disposed are a first recess 7 for forming a lever projection port through which upper end portions (end portions to be engaged with the shift lock pin 108) of the main lever 30 and the sublever 40 are upward projected from the right side portion of the upper side wall of the case 1 to the outside of the case 1, and a second recess 8 for forming a lead wire port through which two lead wires 14a, 14b drawn out from a coil 14 of a solenoid 10 are further drawn out from the left side wall of the case 1 to the outside of the case 1.

The locking device further comprises: the solenoid 10; a stopper 20 which is made of a resin material, and which serves as the second movable member; the main lever 30 which serves as the first movable member; the sublever 40 which serves as the third movable member; a second return spring 50 which is configured by a coil spring, and which serves as the second urging member for the stopper; a first return spring 60 which is configured by a coil spring, and which serves as the first urging member for the main lever; and a third return spring 70 which is configured by a coil spring, and which serves as the third urging member for the sublever.

The solenoid 10 of the locking device is placed in a left upper corner of the interior of the case 1 on the side of the first case 2. The solenoid 10 is configured as the suction type by: a hook-shaped frame (yoke) 11 which is made of a magnetic material, and which is bent at right angle so as to extend along inner walls of left and upper side walls of the first case 2; a columnar stationary core 12 which is made of a magnetic material, which is projected in a cantilevered manner in parallel to a horizontal piece 11b b of the frame 11 extending along the upper-wall inner face of the first case 2, from a substantially middle portion of a vertical piece 11a of the frame 11 extending along the left-wall inner face of the first case 2, and which is placed in a horizontal posture in which the axis is laterally directed, in a substantially vertically middle portion of a left-half portion of the interior of the first case 2; the coil 14 which is configured by winding an insulated copper wire or the like around a bobbin 13 made of an insulating material, and which is concentrically placed on the outer circumference of the stationary core 12; and a movable plate 16 which is made of a magnetic material, in which an upper end portion is engaged with a tip end portion of the horizontal piece 11b of the frame 11 by a hinge structure, to function as a fulcrum 15, and which is hangingly supported from the tip end portion of the horizontal piece 11b of the frame 11 on the right side of the stationary core 12 and the coil 14 via the fulcrum 15, and placed so as to be swingable in lateral directions contacted with and separated from the stationary core 12 in a substantially laterally middle portion of the interior of the first case 2. In the attraction type solenoid 10, the stationary core 12 in the coil 14 is magnetized by energizing the coil 14 to conduct an operation of attracting the movable plate 16 which is separated from the stationary core 12 by a constant distance (stroke), toward the stationary core 12 by an attraction force which acts between the stationary core 12 and the movable plate 16. In the attraction type solenoid 10, a shock-absorbing member 17 configured by a thin rubber plate is bonded to the surface (tip end face) of the stationary core 12 to which the movable plate 16 is to be attracted. The shock-absorbing member 17 can prevent a harsh operation noise (metallic sound of collision of the movable plate 16 against the stationary core 12) from being generated. The two lead wires 14a, 14b drawn out from the coil 14 are further drawn out from the left side wall of the case 1 to the outside of the case 1 through a recess 18 disposed in a corner portion of one side end face of the frame 11 on the side of the second case 3, and the second recess 8 of the first case 2. The coil 14 of the attraction type solenoid 10 is energized in accordance with a depressing operation on a foot brake when an ignition key of the vehicle is turned on, and is not energized when the foot brake is not depressed.

The stopper 20 which serves as the second movable member is formed into a quadrangular prism-like shape, and placed under the attraction type solenoid 10 on the side of the first case 2 in the interior of the case 1, and in a horizontal posture in which the axis is laterally directed.

The stopper is disposed so as to be laterally reciprocable along the inner face of the lower side wall of the first case 2. Between the stopper 20 and the left side wall of the first case 2, the second return spring 50 is disposed in a compressed state coaxially with the axis of the stopper 20, to always urge the stopper 20 in the rightward direction. In the stopper 20, an engagement groove 21 is disposed in a substantially middle portion in the longitudinal direction in one side face on the side of the second case 3, and a tip end portion of the movable plate 16 of the attraction type solenoid 10 is inserted from the upper side into the engagement groove 21 to be engaged therewith.

In the above configuration, in a nonenergization period of the coil 14 of the attraction type solenoid 10, an attraction force is not generated between the stationary core 12 and the movable plate 16. As indicated by the solid lines in FIG. 1, the stopper 20 is held by the urging force of the second return spring 50 to a position (locking position) where the stopper butts against the right side wall of the first case 2, and the movable plate 16 whose tip end portion is engaged with the stopper 20 is held to a separating position which is separated from the stationary core 12 by a constant distance (stroke). When the coil 14 of the attraction type solenoid 10 is energized, an attraction force is generated between the stationary core 12 and the movable plate 16. Therefore, the movable plate 16 which is at the separating position is attracted toward the stationary core 12, and leftward swung until the plate is closely contacted with the shock-absorbing member 17 disposed on the tip end face of the stationary core 12, while the stopper 20 engaged with the tip end portion of the movable plate 16 is leftward linearly operated from the locking position against the urging force of the second return spring 50. When the energization of the coil 14 of the attraction type solenoid 10 is continued, as indicated by the phantom lines in FIG. 1, the attraction force generated between the stationary core 12 and the movable plate 16 holds the movable plate 16 in the state where the plate is closely contacted with the shock-absorbing member 17 disposed on the tip end face of the stationary core 12, and holds the stopper 20 engaged with the tip end portion of the movable plate 16 against the urging force of the second return spring 50 to a separating position (unlocking position) which is separated by a constant distance from the right side wall of the first case 2. By contrast, when the energization of the coil 14 of the attraction type solenoid 10 is turned off, the attraction force generated between the stationary core 12 and the movable plate 16 disappears. By the urging force of the second return spring 50, therefore, the stopper 20 is rightward linearly operated from the unlocking position, and returned and held to the original locking position. The movable plate 16 whose tip end portion is engaged with the stopper 20 is rightward swung in accordance with the returning operation of the stopper 20 to the locking position, to be separated by the constant distance from the stationary core 12, and returned and held to the original separating position.

The main lever 30 which serves as the first movable member is configured by: a first engagement portion 31 having a quadrangular prism-like shape; and a plate-like second engagement portion 33 which is thinner than the first engagement portion 31, and which has three side faces that are flush with three side faces of the first engagement portion 31, and one side face that is continuous to the remaining one face of the first engagement portion 31 via a stepped face (one end face of the first engagement portion 31) 32. The main lever 30 is placed inside the case 1 on the right side of the attraction type solenoid 10 on the side of the first case 2 in a vertical posture which is perpendicular to the stopper 20, in a state where the stepped one side face (left side face) is directed toward the attraction type solenoid 10, the flush right side face is contacted with the inner face of the right side wall of the first case 2, the first engagement portion 31 is located in the upper side, and the second engagement portion 33 is located in the lower side. The main lever 30 is disposed so as to be vertically reciprocable along the inner face of the right side wall of the first case 2. The main lever 30 is formed so as to have an approximately same length as the height of the external shape of the case 1. In order to set the operation region (to restrict the operation range) of the main lever 30 between the two side faces adjacent to the left side face of the first engagement portion 31 opposed to the attraction type solenoid 10, and the faces on the sides of the first and second cases 2, 3 with which the two side faces are slidingly contacted, a rectangular bottomed guide groove 34 having a predetermined vertical length is disposed in the two side faces adjacent to the left side face of the first engagement portion 31 opposed to the attraction type solenoid 10, and a flat rectangular guide projection 35 which is slidably fitted into the bottomed guide groove 34 is disposed integrally with the faces on the sides of the first and second cases 2, 3 with which the two side faces adjacent to the left side face of the first engagement portion 31 opposed to the attraction type solenoid 10 are slidingly contacted. In the case 1, the main lever 30 is disposed so as to be overridable on the stopper 20 in the locking position, and to be reciprocable vertically and linearly between: the maximum raised position (engaging position with the shift lock pin 108) where the lower end of the main lever 30 (the tip end of the second engagement portion 33) is raised to a substantially same level as the upper side face of the stopper 20, and an upper end portion of the main lever 30 (a tip end portion of the first engagement portion 31) is projected by a predetermined projection length H1 from a right side portion of the upper side wall of the case 1 via the lever projection port formed by the first recess 7 of the first case 2 to the outside of the case 1; and the maximum lowered position (disengaging position with the shift lock pin 108) where, in the case 1, the lower end of the main lever 30 is lowered more than the upper side face of the stopper 20, and the upper end portion of the main lever 30 is projected by a predetermined projection length H2 which is shorter than the projection length H1 at the engaging position from a right side portion of the upper side wall of the case 1 via the lever projection port formed by the first recess 7 of the first case 2 to the outside of the case 1 (the upper end portion of the main lever 30 which is projected from the right side portion of the upper side wall of the case 1 via the lever projection port formed by the first recess 7 of the first case 2 to the outside of the case 1 is retracted into the case 1 so as to have the predetermined projection length H2 which is shorter than the projection length H1 at the engaging position). The projection lengths H1, H2 of the upper end portion of the main lever 30 are set so that, as indicated by the solid lines in FIG. 4, the longer length H1 is set to a value which restricts the passing of the shift lock pin 108 from the lower end portion of the shift lock groove 109 to the beginning portion of the guide groove 110, or the passing from the beginning portion of the guide groove 110 to the lower end portion of the shift lock groove 109, and, as indicated by the phantom lines in FIG. 4, the shorter length H2 is set to a value which allows the passing of the shift lock pin 108 from the lower end portion of the shift lock groove 109 to the guide groove 110, or the passing from the beginning portion of the guide groove 110 to the lower end portion of the shift lock groove 109. The projection length H2 of the upper end portion of the main lever 30 may be "0". Inside the second engagement portion 33 of the main lever 30, the first return spring 60 is disposed in a compressed state to always urge the main lever 30 in the upward direction, between the first engagement portion 31, and a spring seat 36 which is projected integrally from the first case 2 at a position that is opposed to the stepped face 32, that is lower than the lower end of the first engagement portion 31, i.e., the stepped face 32, and that is higher than the stopper 20. The horizontal lower face of the spring seat 36 cooperates with the inner lower side face of the first case 2 to sandwich the stopper 20 therebetween so as to be laterally slidable, thereby enabling the spring seat to function also as a slide guide for the stopper 20. The vertical right end face of the spring seat 36 cooperates with the inner right side face of the first case to sandwich the second engagement portion 33 of the main lever 30 therebetween so as to be vertically slidable, thereby enabling the spring seat to function also as a slide guide for the main lever 30. Alternatively, with respect to the bottomed guide groove 34 and the guide projection 35 for setting the operation region of the main lever 30, the bottomed guide groove 34 may be disposed on the side of the first and second cases 2, 3, and the guide projection 35 may be disposed on the side of the main lever 30.

In the above configuration, an end portion on the locking side in the operation region between the locking and unlocking positions of the stopper 20, and an end portion on the unlocking side in the operation region between the locking and unlocking positions of the main lever 30 overlap with each other in the right lower corner on the side of the first case 2 in the case 1. Depending on the operation position of the stopper 20, the operation region of the stopper is caused to overlap with, or separate from the operation region of the main lever 30, thereby restriction or allowing the operation of the main lever 30 from the locking position to the unlocking position. In the nonenergization period of the coil 14 of the attraction type solenoid 10 in the state where the main lever 30 is held to the engaging position by the urging force of the first return spring 60, the stopper 20 and the movable plate 16 are returned and held to the locking position and the separating position by the urging force of the second return spring 50. As indicated by the solid lines in FIG. 1, therefore, the right end portion of the stopper 20 at the locking position is sandwiched between the lower end of the main lever 30 at the engaging position and the lower side walls of the first case 2, and the main lever 30 at the engaging position overrides the right end portion of the stopper 20 at the locking position. The stopper 20 at the locking position restricts the operation of the main lever 30 from the engaging position to the disengaging position. The main lever 30 is fixed at the engaging position where the upper end portion is projected by the projection length H1 from the right side portion of the upper side wall of the case 1 to the outside of the case 1 via the lever projection port formed by the first recess 7 of the first case 2. When the coil 14 of the attraction type solenoid 10 is energized, the movable plate 16 and the stopper 20 are leftward operated toward the unlocking position by the attraction force generated between the stationary core 12 and the movable plate 16. As indicated by the phantom lines in FIG. 1, therefore, the right end portion of the stopper 20 is separated from the position between the lower end of the main lever 30 at the engaging position and the lower side wall of the first case 2 to the left side, and a gap corresponding to the height of the stopper 20 is formed (an operation region corresponding to the height of the stopper 20 is formed under the main lever 30 at the engaging position), whereby the operation of the main lever 30 from the engaging position to the disengaging position is allowed, so that the main lever 30 can be operated to the disengaging position where the upper end portion is projected from the right side portion of the upper side wall of the case 1 via the lever projection port formed by the first recess 7 of the first case 2, to the outside of the case 1 by the projection length H2 (the upper end portion of the main lever 30 which is projected from the right side portion of the upper side wall of the case 1 via the lever projection port formed by the first recess 7 of the first case 2 to the outside of the case 1 is retractable into the case 1 so as to have the predetermined projection length H2 which is shorter than the projection length H1 at the engaging position).

The sublever 40 is formed into a plate-like shape having an approximately same length as the first engagement portion 31 of the main lever 30, and a flat head portion 41 is formed perpendicularly integrally on one end. In accordance with a shift operation of the shift lever 103 from a range position other than the P-range to the P-range position, the shift lock pin 108 which is moved in the guide groove 110 toward the beginning portion of the groove is engaged from a lateral side in the beginning portion of the guide groove 110 with one side face of the main lever 30, i.e., one side face (left side face) of the first engagement portion 31 on the side the attraction type solenoid 10. In the side face, a sublever attachment groove 37 is disposed with which an approximately half of the total width of the sublever 40 is vertically slidably fitted and engaged. In a state where the head portion 41 of the sublever 40 is opposed in underside to the stepped face 32 of the main lever 30, and an approximately half of the total width of the sublever 40 is perpendicularly projected from a middle portion of the left side face of the main lever 30, the sublever 40 is attached to the main lever 30 via the sublever attachment groove 37. The third return spring 70 is disposed in a compressed state between the head portion 41 of the sublever 40 and the spring seat 36, to always upward urge the sublever 40, and to upward urge the main lever 30 via the head portion 41 of the sublever 40. The urging force of the third return spring 70 is set to be larger than that of the first return spring 60. In a state where the head portion 41 is buttingly engaged from the lower side with the stepped face 32 of the main lever 30 by the urging force of the third return spring 70, the sublever 40 can be vertically reciprocated integrally with the main lever 30, and can be vertically reciprocated independently from the main lever 30. When the head portion 41 of the sublever 40 is buttingly engaged from the lower side with the stepped face 32 of the main lever 30, the upper end of the sublever 40 coincides with that of the main lever 30, and the upper end faces of the levers 30, 40 are flush with each other. In the main lever 30, in order to, in accordance with a shift operation of the shift lever 103 from a range position other than the P-range to the P-range position, allow the main lever 30 to be pressed down from the engaging position to the disengaging position against the urging forces of the first and third return springs 60, 70 by the sliding contact with the shift lock pin 108 which is moved in the guide groove 110 toward the beginning portion of the groove, a left upper edge portion of the first engagement portion 31 is chamfered, and a tapered face 38 is disposed in an upper end portion of the left side face of the first engagement portion 31. In the sublever 40, in order to, in accordance with a shift operation of the shift lever 103 from a range position other than the P-range to the P-range position, allow the sublever 40 to be singly pressed down against the urging force of the third return spring 70 with respect to the main lever 30 at the engaging position in advance of the pressing down operation of the main lever 30 at the engaging position by the sliding contact with the shift lock pin 108 which is moved in the guide groove 110 toward the beginning portion of the groove, a left upper edge portion of the sublever 40 is chamfered in the same manner as the main lever 30, and a tapered face 42 which is substantially parallel to the tapered face 38 of the main lever 30 is disposed in an upper end portion of the left side face of the sublever 40. In the sublever 40, a movable-plate pressing portion 43 which is projected from the left lower edge portion of the sublever 40 toward the movable plate 16 is integrally disposed in order that, in accordance with a single pressing down operation of the sublever 40 on the main lever 30 at the engaging position, in the nonenergization period of the coil 14 of the attraction type solenoid 10, the sublever is slidingly contacted with the surface of the movable plate 16 which is returned and held to the separating position, the surface being on the side opposite to the stationary core 12, and the movable plate 16 of the attraction type solenoid 10 is pressed against the stationary core 12 until the plate is closely contacted from the separating position with the shock-absorbing member 17 disposed on the tip end face of the stationary core 12 against the urging force of the second return spring 50. A resin plate 44 which is made of the same material as the sublever 40 is bonded to the metal surface of the movable plate 16 with which the movable-plate pressing portion 43 made of a resin is slidingly contacted, in order to prevent the movable-plate pressing portion 43 from abrading, and to obtain a pressing force on the movable plate 16. A lower edge portion of the tip end of the movable-plate pressing portion 43 is rounded (R), and the upper end of the resin plate 44 is tapered, so that the movable-plate pressing portion 43 can smoothly override the surface of the resin plate 44. Preferably, an urging member 19 configured by a coil spring or a plate spring that always urges the movable plate 16 in a direction along which the plate is separated from the stationary core 12 is disposed in the attraction type solenoid 10. The urging force of the urging member 19 is set to be smaller than that of the second return spring 50. The movable plate 16 of the attraction type solenoid 10 is always contacted and held to the movable-plate pressing portion 43 of the sublever 40 by the urging force of the urging member 19.

In the above configuration, in a state where the main lever 30 is fixed at the engaging position and in a nonenergization period of the coil 14 of the attraction type solenoid 10, the shift lock pin 108 which is moved in the guide groove 110 toward the beginning portion of the groove in accordance with a shift operation of the shift lever 103 from a range position other than the P-range to the P-range position is first contacted form the left side with the tapered face 42 of the sublever 40 in the beginning portion of the guide groove 110, to rightward press the tapered face 42, whereby the sublever 40 is singly pressed down against the urging force of the third return spring 70 with respect to the main lever 30 at the engaging position. In accordance with the single pressing down operation of the sublever 40 on the main lever 30 at the engaging position, the movable-plate pressing portion 43 disposed on the lower end of the sublever 40 presses the movable plate 16 of the attraction type solenoid 10 against the stationary core 12 until the plate is closely contacted from the separating position with the shock-absorbing member 17 disposed on the tip end face of the stationary core 12 against the urging force of the second return spring 50. In the same manner as the energization period of the coil 14 of the attraction type solenoid 10, therefore, a state where the operation of the main lever 30 from the engaging position to the disengaging position is allowed is produced (the unlocking operation is mechanically conducted). While pressing and holding the sublever 40, thereafter, the shift lock pin 108 is slidingly contacted from the left side with the tapered face 38 of the main lever 30 to rightward press the tapered face 38, whereby the main lever 30 in which the operation from the engaging position to the disengaging position is allowed is pressed down to the disengaging position against the urging force of the first return spring 60.

Referring to FIG. 3, the operation of the thus configured locking device will be described. For example, in the case where the select button 107 is operated to shift-operate the shift lever 103 located at the P-range to another range position, when the foot brake is not depressed, the coil 14 of the attraction type solenoid 10 of the locking device is not energized. In the nonenergization period of the coil 14 of the attraction type solenoid 10, an attraction force is not generated between the stationary core 12 and the movable plate 16. As shown in FIG. 3(A), therefore, the stopper 20 is held to the locking position by the urging force of the second return spring 50, and the movable plate 16 of the attraction type solenoid 10 in which the tip end portion is engaged with the stopper 20 is held to the separating position. The operation of the main lever 30 from the engaging position to the disengaging position is restricted by the stopper 20 at the locking position. Therefore, the shift lock pin 108 is buttingly engaged before the lower end portion of the shift lock groove 109 from the upper side with the tip end face of the main lever 30 in which the operation from the engaging position is restricted, and cannot be moved to the lower end portion of the shift lock groove 109. Therefore, the shift lever 103 cannot be shift-operated from the P-range position to another range position, and is locked to the P-range position. The locking device is provided with the shift lever locking function.

By contrast, when the foot brake is depressed, the coil 14 of the attraction type solenoid 10 of the locking device is energized in accordance with the operation of depressing the foot brake. In the energization period of the coil 14 of the attraction type solenoid 10, an attraction force is generated between the stationary core 12 and the movable plate 16. As shown in FIG. 3(B), by the attraction force generated between the stationary core 12 and the movable plate 16, therefore, the movable plate 16 at the separating position is attracted toward the stationary core 12 against the urging force of the second return spring 50, and the stopper 20 which is engaged with the tip end portion of the movable plate 16 is operated from the locking position to the unlocking position, thereby allowing the main lever 30 to be operated from the engaging position to the disengaging position. Therefore, the shift lock pin 108 is buttingly engaged before the lower end portion of the shift lock groove 109 from the upper side with the tip end face of the main lever 30 in which the operation from the engaging position to the disengaging position is restricted, and thereafter can be passed through the lower end portion of the shift lock groove 109 to be moved to the beginning portion of the guide groove 110 while pressing down the main lever 30 integrally with the sublever 40 to the disengaging position against the urging forces of the first and third return springs 60, 70. As a result, the shift lever 103 can be shift-operated from the P-range position to another range position. The locking device is provided with the electrical shift lever unlocking function.

After the shift lever 103 which is located at the P-range position is shift-operated to another range position such as the D-range position, the foot is lifted off the foot brake, and the accelerator lever is depressed to start the vehicle. In this case, in the state where the shift lock pin 108 is located in the guide groove 110, the locking device is returned to the locked state shown in FIG. 3(A).

When the shift lever 103 is shift-operated from a range position other than the P-range to the P-range position, the shift lock pin 108 which is moved in the guide groove 110 toward the beginning portion of the groove operates in the following manner in accordance with the shift operation. In the beginning portion of the guide groove 110, as shown in FIG. 3(C), the sublever 40 is first singly pressed with respect to the main lever 30 at the engaging position via the tapered face 42 against the urging force of the third return spring 70, and, in the same manner as the energization period of the coil 14 of the attraction type solenoid 10, the operation of the main lever 30 from the engaging position to the disengaging position is allowed. As shown in FIG. 3(D), thereafter, while the sublever 40 is pressed down and held, the main lever 30 in which the operation from the engaging position to the disengaging position is allowed is pressed down via the tapered face 38 to the disengaging position against the urging force of the first return spring 60, and the shift lock pin 108 can be passed through the beginning portion of the guide groove 110 to be moved to the lower end portion of the shift lock groove 109. According to the configuration, even when an operation of depressing the foot brake is not involved and the coil 14 of the attraction type solenoid 10 of the locking device is not energized, the shift lever 103 can be shift-operated from a range position other than the P-range to the P-range position. The locking device is provided with the mechanical shift lever unlocking function.

Figure 3A:
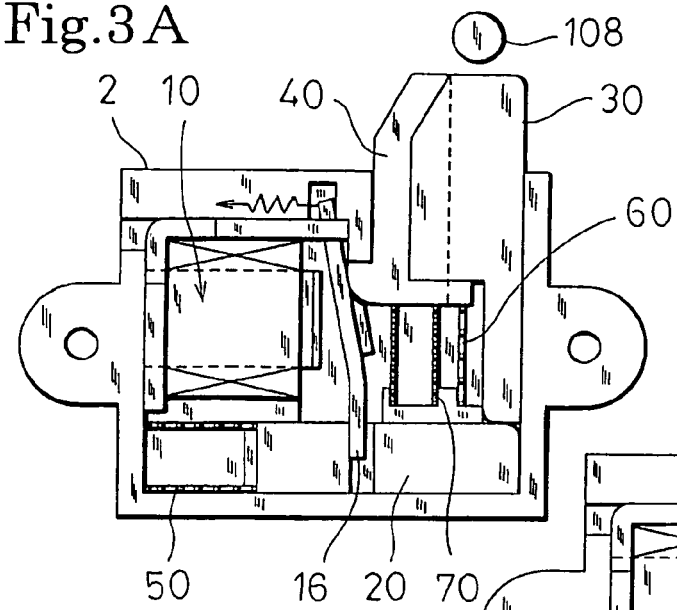
FIG. 3 is an operation diagram of the locking device.
Figure 3B:
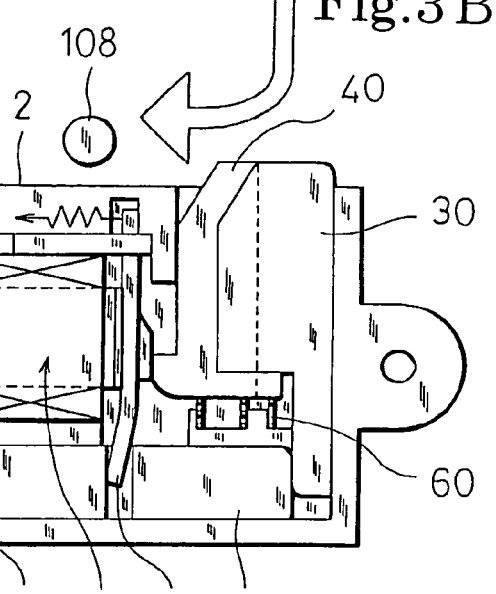
Figure 3C:
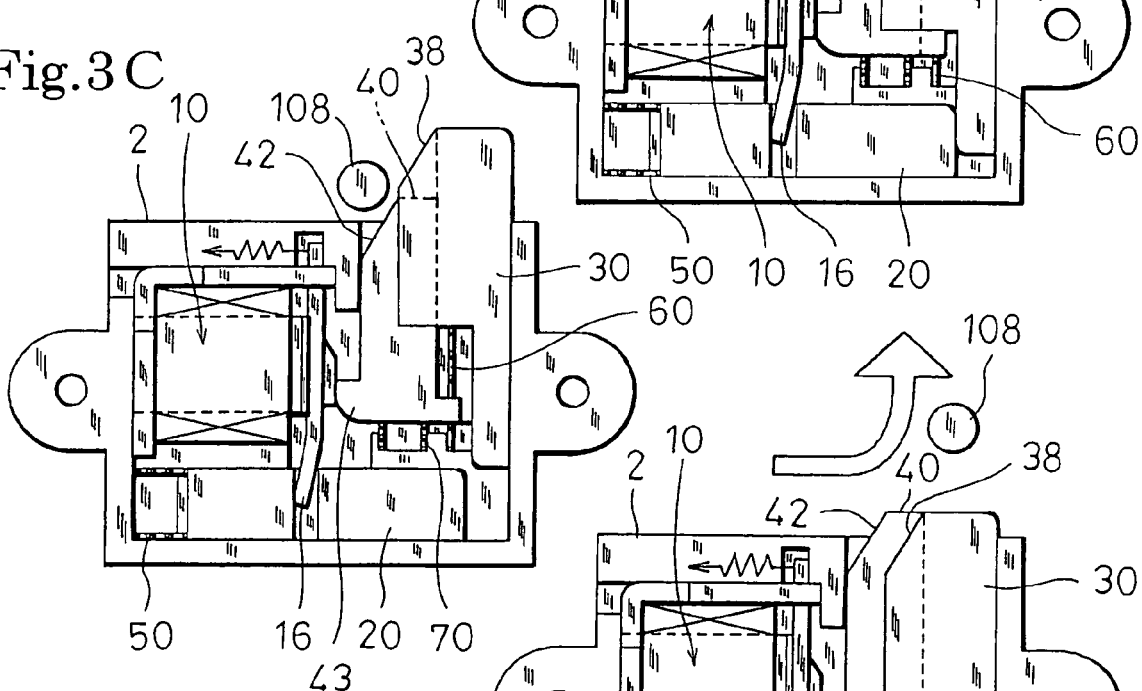
Figure 3D:
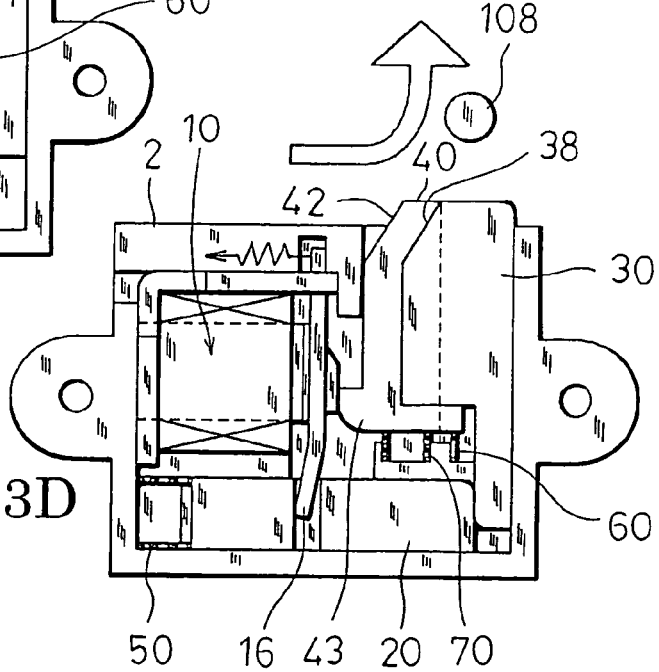
Figure 4:
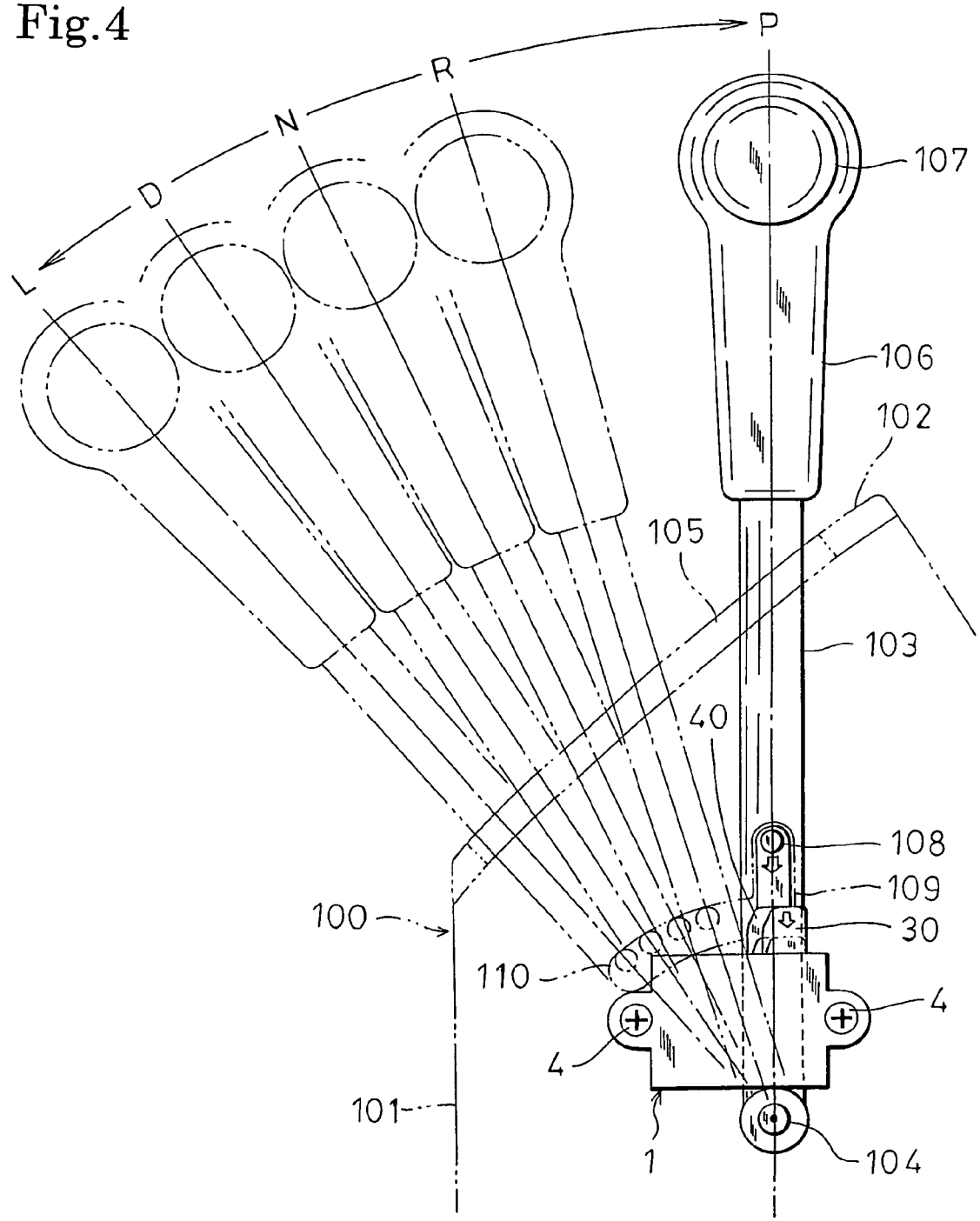
FIG. 4 is a diagram schematically illustrating a shift lever mechanism of the vehicle automatic transmission apparatus which is an external mechanism of the locking device.

After the shift lever 103 is shift-operated from a range position other than the P-range to the P-range position, the shift lock pin 108 is returned and held to an upper end portion of the shift lock groove 109, and the locking device is returned to the locked state shown in FIG. 3(A).

Figure 5:
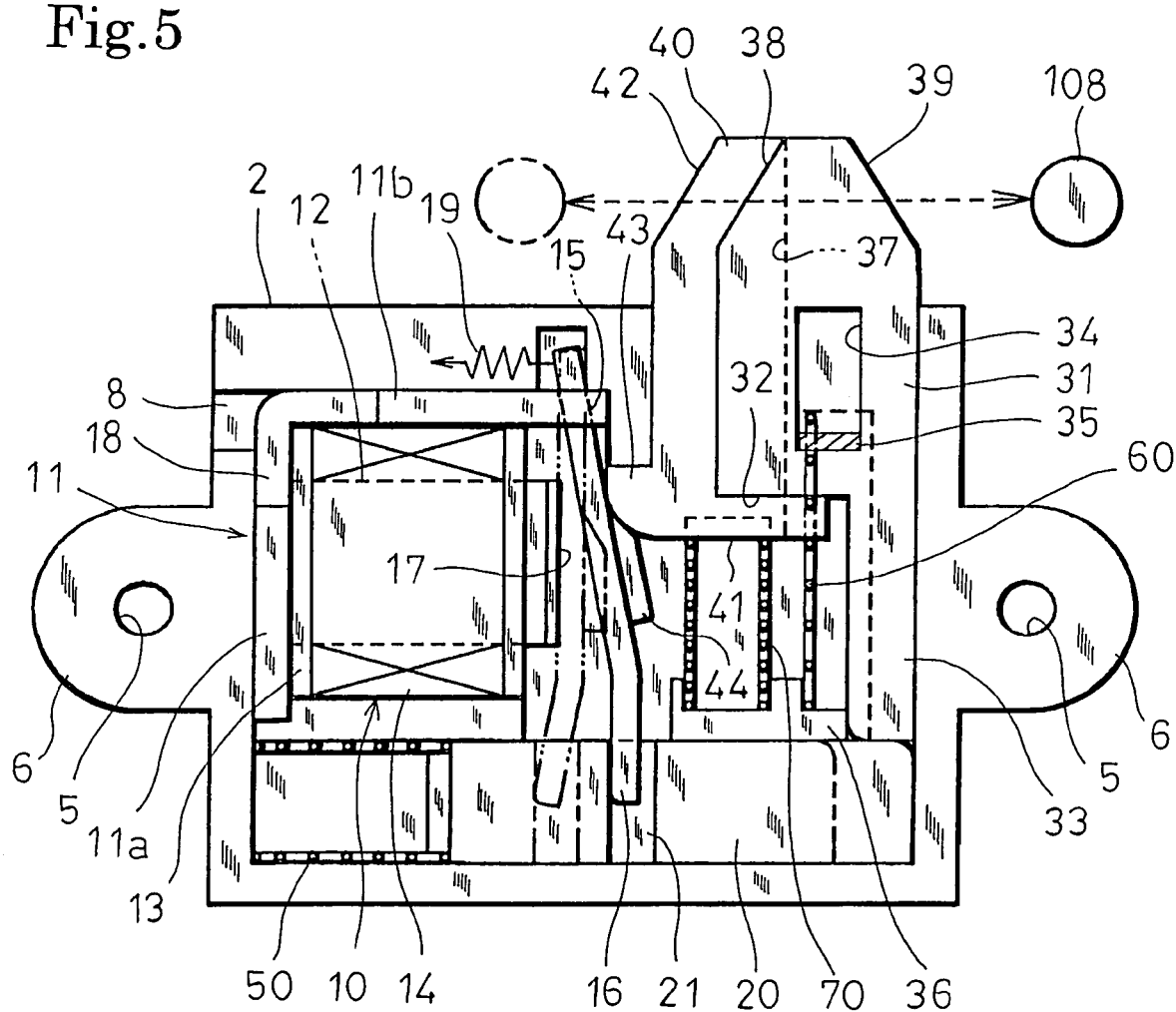
FIG. 5 is a diagram of a locking device of a modification.

In the locking device of the embodiment, if the shift lock pin 108 is to be passed with being advanced from the right side of the main lever 30 to the left side, and further passed with being returned from the left side to the right side, the right upper edge portion of the first engagement portion 31 of the main lever 30 may be chamfered to add a tapered face 39 to an upper end portion of the right side face of the first engagement portion 31 as shown in FIG. 5. According to the configuration, in the nonenergization period of the coil 14 of the attraction type solenoid 10, the passage of the shift lock pin 108 from the right side of the main lever 30 to the left side is restricted, and, as a result of energization, the main lever 30 is pressed down via the tapered face 39 to the disengaging position against the urging forces of the first and third return springs 60, 70, thereby allowing the passage of the shift lock pin 108. The passage of the shift lock pin 108 from the left side of the main lever 30 to the right side is enabled by the above-mentioned mechanical shift lever unlocking function. The locking device of the modification shown in FIG. 5 is configured in the same manner as the locking device of FIG. 1 except the tapered face 39. Therefore, the identical components are denoted by the reference numerals, and their description is omitted.

As described above, as shown in, for example, FIG. 5, the locking device of the embodiment is enabled to conduct the shift lever lock at a predetermined range position other than the P-range position by changing the tip end shapes of the main lever 30 and the sublever 40. Furthermore, the locking device can be preferably used in a shift lever mechanism for a vehicle automatic transmission apparatus other than the shift lever mechanism shown in the embodiment. The locking device is not restricted to a shift lever lock of a vehicle automatic transmission apparatus, and may be used in locking in various products such as a door lock of a household electrical appliance. Namely, the locking device has an excellent versatility.

What is claimed is:

1. A locking device wherein said locking device comprises:
  a first movable member which is reciprocable between an engaging position with respect to an external mechanism and a disengaging position;
  a first urging member which always urges said first movable member toward the engaging position;
  a second movable member which is reciprocable in a direction perpendicular to said first movable member between a locking position where one end portion overlaps with an operation region end portion in a disengaging direction of said first movable member, and a unlocking position where said one end portion deviates from said operation region end portion;
  a second urging member which always urges said second movable member toward the locking position; and
  a solenoid in which a stationary core in a coil is magnetized by energization of said coil to attract a movable plate swingably attached to a frame by an attraction force acting between said stationary core and said movable plate, from a separating position which is separated from said stationary core by predetermined distance, toward said stationary core, a tip end portion of said movable plate of said solenoid is engaged with said second movable member, and, in a nonenergization period of said coil of said solenoid, by an urging force of said second urging member, said second movable member is held to the locking position and said movable plate of said solenoid is held to the separating position, said second movable member at the locking position restricts an operation of said first movable member from the engaging position to the disengaging position, and, in an energization period of said coil of said solenoid, by the attraction force acting between said stationary core and said movable plate, said movable plate of said solenoid is attracted against the urging force of said second urging member from the separating position toward said stationary core and said second movable member is operated from the locking position toward the unlocking position, thereby allowing said first movable member to be operated from the engaging position to the disengaging position.

2. A locking device according to claim 1, wherein: a shock-absorbing member is disposed on a surface of said stationary core to which said movable plate of said solenoid is to be attracted.

3. A locking device according to claim 1, wherein: a tapered face is disposed in an end portion of said first movable member which is to be engaged with said external mechanism, said tapered face being slidingly contacted with said external mechanism in one direction to cause said first movable member to operate against the urging force of said first urging member from the engaging position toward the disengaging position;
  said locking device further comprises:
  a third movable member which is engaged with said first movable member, and which is operable independent from said first movable member; and
  a third urging member which always urges said third movable member in a same direction as said first movable member, a tapered face is disposed in an end portion of said third movable member which is located on a side of said end portion of said first movable member which is to be engaged with said external mechanism, said tapered face being of said third movable member slidingly contacted with said external mechanism in advance of said tapered face of said first movable member, to cause said third movable member against an urging force of said third urging member to independently operate in advance of said first movable member, a movable-plate pressing portion is disposed in another end portion of said third movable member, and the independent operation of said third movable member causes said movable plate of said solenoid to be pressed against the urging force of said second urging member from the separating position toward said stationary core, and said second movable member to be operated from the locking position toward the unlocking position, thereby allowing the first movable member to be operated from the engaging position to the disengaging position.

4. A locking device according to claim 1, wherein:
  a shock-absorbing member is disposed on a surface of said stationary core to which said movable plate of the solenoid is to be attracted, a tapered face is disposed in an end portion of said first movable member which is to be engaged with said external mechanism, said tapered face being slidingly contacted with said external mechanism in one direction to cause said first movable member to operate against the urging force of said first urging member from the engaging position toward the disengaging position,
  said locking device further comprises:
  a third movable member which is engaged with said first movable member, and which is movable independent from said first movable member; and a third urging member which always urges said third movable member in a same direction as said first movable member, a tapered face is disposed in an end portion of said third movable member which is located on a side of said end portion of said first movable member which is to be engaged with said external mechanism, said tapered face of said third movable member being slidingly contacted with said external mechanism in advance of said tapered face of said first movable member, to cause said third movable member against an urging force of said third urging member to independently operate in advance of said first movable member, a movable-plate pressing portion is disposed in another end portion of said third movable member, and the independent operation of said third movable member causes said movable plate of said solenoid to be pressed against the urging force of said second urging member from the separating position toward said stationary core, and said second movable member to be operated from the locking position toward the unlocking position, thereby allowing the first movable member to be operated from the engaging position to the disengaging position.

5. A locking device according to claim 1, wherein:
said external mechanism is a shift lever mechanism for a vehicle automatic transmission apparatus, energization of said coil of said solenoid is conducted in accordance with a depressing operation on an foot brake;
in a nonenergization period of said coil of said solenoid when the foot brake is not depressed, said first movable member in which an operation from the engaging position to the disengaging position is restricted restricts a shift operation of a shift lever from a predetermined range position to another range position; and
in an energization period of said coil of said solenoid in accordance with a depressing operation on the foot brake, an operation of said first movable member from the engaging position to the disengaging position is allowed, and a shift operation of said shift lever from the predetermined range position to another range position is allowed.

6. A locking device according to claim 1, wherein:
a shock-absorbing member is disposed on a surface of said stationary core to which said movable plate of the solenoid is to be attracted, said external mechanism is a shift lever mechanism for a vehicle automatic transmission apparatus, energization of said coil of said solenoid is conducted in accordance with a depressing operation on a foot brake;
in a nonenergization period of said coil of said solenoid when the foot brake is not depressed, said first movable member in which operation from the engaging position to the disengaging position is restricted restricts a shift operation of a shift lever from of said third movable member the predetermined range position to another range position; and
in an energization period of said coil of said solenoid in accordance with a depressing operation on the foot brake, an operation of said first movable member from the engaging position to the disengaging position is allowed, and an shift operation of said shift lever from the predetermined range position to another range position is allowed.

7. A locking device according to claim 1, wherein a shock-absorbing member is disposed on a surface of said stationary core to which said movable plate of the solenoid is to be attracted, a tapered face is disposed in an end portion of said first movable member which is to be engaged with said external mechanism, said tapered face being slidingly contacted with said external mechanism in one direction to cause said first movable member to operate against the urging force of said first urging member from the engaging position toward the disengaging position, said locking device further comprises:
a third movable member which is engaged with said first movable member, and which is movable independent from said first movable member; and a third urging member which always urges said third movable member in a same direction as said first movable member;
a tapered face is disposed in an end portion of said third movable member which is located on a side of said end portion of said first movable member which is to be engaged with said external mechanism, said tapered face being slidingly contacted with said external mechanism in advance of said tapered face of said first movable member, to cause said third movable member against an urging force of said third urging member to independently operate in advance of said first movable member, a movable-plate pressing portion is disposed in another end portion of said third movable member, the independent operation of said third movable member causes said movable plate of said solenoid to be pressed against the urging force of said second urging member from the separating position toward said stationary core, and said second movable member to be operated from the locking position toward the unlocking position, thereby allowing the first movable member to be operated from the engaging position to the disengaging position, said external mechanism is a shift lever mechanism for a vehicle automatic transmission apparatus, energization of said coil of said solenoid is conducted in accordance with a depressing operation on a foot brake, and, in a nonenergization period of said coil of said solenoid when the foot brake is not depressed, said first movable member in which operation from the engaging position to the disengaging position is restricted restricts a shift operation of a shift lever from a predetermined range position to another range position, and, in an energization period of said coil of said solenoid in accordance with a depressing operation on the foot brake, an operation of said first movable member from the engaging position to the disengaging position is allowed, and a shift operation of said shift lever from the predetermined range position to another range position is allowed.

8. A locking device according to claim 1, wherein:
said external mechanism is a shift lever mechanism for a vehicle automatic transmission apparatus, energization of said coil of said solenoid is conducted in accordance with a depressing operation on a foot brake;
in a nonenergization period of said coil of said solenoid when the foot brake is not depressed;
said first movable member in which an operation from the engaging position to the disengaging position is restricted restricts a shift operation of a shift lever from a predetermined range position to another range position;
in an energization period of said coil of said solenoid in accordance with a depressing operation on the foot brake, an operation of said first movable member from the engaging position to the disengaging position is allowed, and a shift operation of said shift lever from the predetermined range position to another range position is allowed; and
in accordance with an a shift operation of said shift lever from another range position to the predetermined range position, a third movable member is independently operated, thereby allowing an operation of said first movable member from the engaging position to the disengaging position.

9. A locking device according to claim 1, wherein:
a third movable member is provided;
a shock-absorbing member is disposed on a surface of said stationary core to which said movable plate of the solenoid is to be attracted, said external mechanism is a shift lever mechanism for a vehicle automatic transmission apparatus, energization of said coil of said solenoid is conducted in accordance with a depressing operation on a foot brake, and, in a nonenergization period of said coil of said solenoid when the foot brake is not depressed, said first movable member in which operation from the engaging position to the disengaging position is restricted restricts a shift operation of a shift lever from the predetermined range position to another range position;
in an energization period of said coil of said solenoid in accordance with a depressing operation on the foot brake, operation of said first movable member from the engaging position to the disengaging position is allowed, and a shift operation of said shift lever from a predetermined range position to another range position is allowed; and
in accordance with a shift operation of said shift lever from another range position to the predetermined range position, said third movable member is independently operated, thereby allowing operation of said first movable member from the engaging position to the disengaging position.

10. A locking device according to claim 1, wherein:
a shock-absorbing member is disposed on a surface of said stationary core to which said movable plate of the solenoid is to be attracted;
a tapered face is disposed in an end portion of said first movable member which is to be engaged with said external mechanism, said tapered face being slidingly contacted with said external mechanism in one direction to cause said first movable member to operate against the urging force of said first urging member from the engaging position toward the disengaging position, said locking device further comprises: a third movable member which is engaged with said first movable member, and which is movable independent from said first movable member; and a third urging member which always urges said third movable member in a same direction as said first movable member, a tapered face is disposed in an end portion of said third movable member which is located on a side of said end portion of said first movable member which is to be engaged with said external mechanism, said tapered face of said third movable member being slidingly contacted with said external mechanism in advance of said tapered face of said first movable member, to cause said third movable member against an urging force of said third urging member to independently operate in advance of said first movable member, a movable-plate pressing portion is disposed in another end portion of said third movable member, the independent operation of said third movable member causes said movable plate of said solenoid to be pressed against the urging force of said second urging member from the separating position toward said stationary core, and said second movable member to be operated from the locking position toward the unlocking position, thereby allowing the first movable member to be operated from the engaging position to the disengaging position, said external mechanism is a shift lever mechanism for a vehicle automatic transmission apparatus, energization of said coil of said solenoid is conducted in accordance with a depressing operation on a foot brake, and, in a nonenergization period of said coil of said solenoid when the foot brake is not depressed, said first movable member in which operation from the engaging position to the disengaging position is restricted, restricts a shift operation of a shift lever from a predetermined range position to another range position, and, in an energization period of said coil of said solenoid in accordance with a depressing operation on the foot brake, an operation of said first movable member from the engaging position to the disengaging position is allowed, and a shift operation of said shift lever from the predetermined range position to another range position is allowed, and, in accordance with a shift operation of said shift lever from another range position to the predetermined range position, said third movable member is independently operated, thereby allowing an operation of said first movable member from the engaging position to the disengaging position.

11. A locking device, wherein a tapered face is disposed in an end portion of a first movable member which is to be engaged with an external mechanism, said tapered face being slidingly contacted with said external mechanism in one direction to cause said first movable member to operate against an urging force of a first urging member from an engaging position toward an disengaging position, said locking device comprises:
a second movable member;
a second urging member;
a third movable member which is engaged with said first movable member, and which is movable independent from said first movable member; and
a third urging member which always urges said third movable member in a same direction as said first movable member, a tapered face is disposed in an end portion of said third movable member which is located on a side of said end portion of said first movable member which is to be engaged with said external mechanism, said tapered face of said third movable member being slidingly contacted with said external mechanism in advance of said tapered face of said first movable member, to cause said third movable member against an urging force of said third urging member to independently operate in advance of said first movable member, a movable-plate pressing portion is disposed in another end portion of said third movable member, and the independent operation of said third movable member causes a movable plate of a solenoid to be pressed against the urging force of said second urging member from a separating position toward a stationary core, and said second movable member to be operated from a locking position toward an unlocking position, thereby allowing the first movable member to be operated from the engaging position to the disengaging position, the external mechanism is a shift lever mechanism for a vehicle automatic transmission apparatus, energization of a coil of said solenoid is conducted in accordance with a depressing operation on a foot brake, and, in a nonenergization period of said coil of said solenoid when the foot brake is not depressed, said first movable member in which operation from the engaging position to the disengaging position is restricted restricts a shift operation of a shift lever from a predetermined range position to another range position, and, in an energization period of said coil of said solenoid in accordance with a depressing operation on the foot brake, operation of said first movable member from the engaging position to the disengaging position is allowed, and a shift operation of said shift lever from the predetermined range position to another range position is allowed.

12. A locking device, wherein a tapered face is disposed in an end portion of a first movable member which is to be engaged with an external mechanism, said tapered face being slidingly contacted with said external mechanism in one direction to cause said first movable member to operate against an urging force of a first urging member from an engaging position toward a disengaging position, said locking device comprises:

a third movable member which is engaged with said first movable member, and which is movable independent from said first movable member; and a third urging member which always urges said third movable member in a same direction as said first movable member, a tapered face is disposed in an end portion of said third movable member which is located on a side of said end portion of said first movable member which is to be engaged with said external mechanism, said tapered face being slidingly contacted with said external mechanism in advance of said tapered face of said first movable member, to cause said third movable member against an urging force of said third urging member to independently operate in advance of said first movable member, a movable-plate pressing portion is disposed in another end portion of said third movable member, and the independent operation of said third movable member causes a movable plate of a solenoid to be pressed against the urging force of a second urging member from a separating position toward a stationary core, and a second movable member to be operated from a locking position an unlocking position, thereby allowing the first movable member to be operated from the engaging position to the disengaging position, the external mechanism is a shift lever mechanism for a vehicle automatic transmission apparatus, energization of a coil of said solenoid is conducted in accordance with a depressing operation on a foot brake, and, in a nonenergization period of said coil of said solenoid when the foot brake is not depressed, said first movable member in which operation from the engaging position to the disengaging position is restricted restricts a shift operation of said shift lever from a predetermined range position to another range position, and, in an energization period of said coil of said solenoid in accordance with a depressing operation on the foot brake, an operation of said first movable member from the engaging position to the disengaging position is allowed, and a shift operation of said shift lever from the predetermined range position to another range position is allowed, and, in accordance with a shift operation of said shift lever from another range position to the predetermined range position, said third movable member is independently operated, thereby allowing an operation of said first movable member from the engaging position to the disengaging position.

* * * * *